(12) United States Patent
Murugesan et al.

(10) Patent No.: US 11,358,009 B2
(45) Date of Patent: Jun. 14, 2022

(54) PORTABLE BREATHING EQUIPMENT AND RELATED METHODS

(71) Applicant: The Boeing Company, Chicago, IL (US)

(72) Inventors: Vignesh Murugesan, Bangalore (IN); Mohamedmukthar Rahamathulla, Bangalore (IN)

(73) Assignee: The Boeing Company, Chicago, IL (US)

( * ) Notice: Subject to any disclaimer, the term of this patent is extended or adjusted under 35 U.S.C. 154(b) by 601 days.

(21) Appl. No.: 16/356,869

(22) Filed: Mar. 18, 2019

(65) Prior Publication Data
US 2020/0298029 A1    Sep. 24, 2020

(51) Int. Cl.
*A62B 7/14* (2006.01)
*A62B 7/02* (2006.01)

(52) U.S. Cl.
CPC .................. *A62B 7/14* (2013.01); *A62B 7/02* (2013.01); *B64D 2231/025* (2013.01)

(58) Field of Classification Search
CPC .... A62B 7/14; A62B 7/02; A62B 7/00; A62B 7/04; A62B 7/10; A62B 7/12; A62B 25/00; A62B 25/005; A62B 17/04; A62B 17/00; A62B 17/001; A62B 17/006; A62B 17/008; B64D 2231/025; B64D 2231/02; B64D 11/0529; B64D 11/0627; B64D 11/0632; B64D 10/00; B64D 11/00; B65D 75/58; B65D 75/5805; B65D 75/5816; B65D 75/5827; B65D 75/5855; B65D 75/5861; B65D 75/5888; B65D 75/5894; B65D 75/66; B65D 75/70; B65D 51/20; B65D 51/22; B65D 51/221; B65D 51/222; B65D 51/223; B65D 51/224; B65D 51/225; B65D 51/226; B65D 51/227; B65D 51/228
See application file for complete search history.

(56) References Cited

U.S. PATENT DOCUMENTS

| | | | | |
|---|---|---|---|---|
| 4,481,945 A | * | 11/1984 | Levine | A62B 7/14 128/202.13 |
| 5,154,374 A | * | 10/1992 | Beroth | B64D 11/00 244/118.5 |
| 6,247,471 B1 | * | 6/2001 | Bower | A62B 7/02 128/201.23 |
| 2007/0068520 A1 | * | 3/2007 | Laib | A62B 17/04 128/201.19 |
| 2010/0294885 A1 | * | 11/2010 | Bloch | A62B 25/005 244/118.5 |

* cited by examiner

*Primary Examiner* — Joseph D. Boecker
*Assistant Examiner* — Brian T Khong
(74) *Attorney, Agent, or Firm* — Hanley, Flight & Zimmerman, LLC

(57) ABSTRACT

Portable breathing equipment and related methods are disclosed. An example portable breathing equipment (PBE) includes a housing defining a cavity, a cover movably coupled to the housing, and a smoke hood provided in a wrapper and positioned in the cavity. A first portion of the wrapper couples to the housing and a second portion of the wrapper couples to the cover. At least one of the cover or the housing to cause the wrapper to tear to provide an access opening to allow access to the smoke hood when the cover moves from a closed position at which the cover seals the cavity of the housing and an open position at which the cover enables access to the cavity of the housing.

20 Claims, 10 Drawing Sheets

PORTABLE BREATHING EQUIPMENT AND RELATED METHODS

FIELD OF THE DISCLOSURE

This disclosure relates generally to aircraft and, more particularly, to portable breathing equipment and related methods.

BACKGROUND

Aircraft employ portable breathing equipment for the flight crew for use during emergency situations such as, fires, depressurization, aircraft evacuation, etc. The portable breathing equipment are located throughout a cabin of an aircraft.

SUMMARY

An example portable breathing equipment has a housing defining a cavity, and a cover movably coupled to the housing. A smoke hood is provided in a wrapper to be positioned in the cavity. A first portion or the wrapper is to couple to the housing and a second portion of the wrapper to couple to the cover when the wrapper is provided in the cavity. At least one of the cover or the housing is to cause the wrapper to tear to provide an access opening to allow access to the smoke hood when the cover moves from a closed position at which the cover seals the cavity of the housing and an open position at which the cover enables access to the cavity of the housing.

An example portable breathing equipment includes a container to house a smoke hood sealed in a wrapper. The container has a cover moveable between a closed position to prevent access to the smoke hood and an open position to allow access to the smoke hood. A latch is movable between a latched position to retain the container in the closed position and an unlatched position to allow the container to move to the open position. An actuator is to move the latch between the latched position and the unlatched position.

An example method includes obtaining a smoke hood positioned in a sealed wrapper; positioning the sealed wrapper containing the smoke hood in a cavity of a housing; coupling a first portion of the sealed wrapper to a first tear mechanism to be carried by the housing; coupling a second portion of the sealed wrapper different than the first portion to a second tear mechanism to be carried by a cover; and moving the cover to a closed position relative to the housing to prevent access to the sealed wrapper and the smoke hood, the first tear mechanism and the second tear mechanism to automatically cause the sealed wrapper to tear open to expose the smoke hood in response to the cover moving to an open position relative to the housing.

Figure 1:
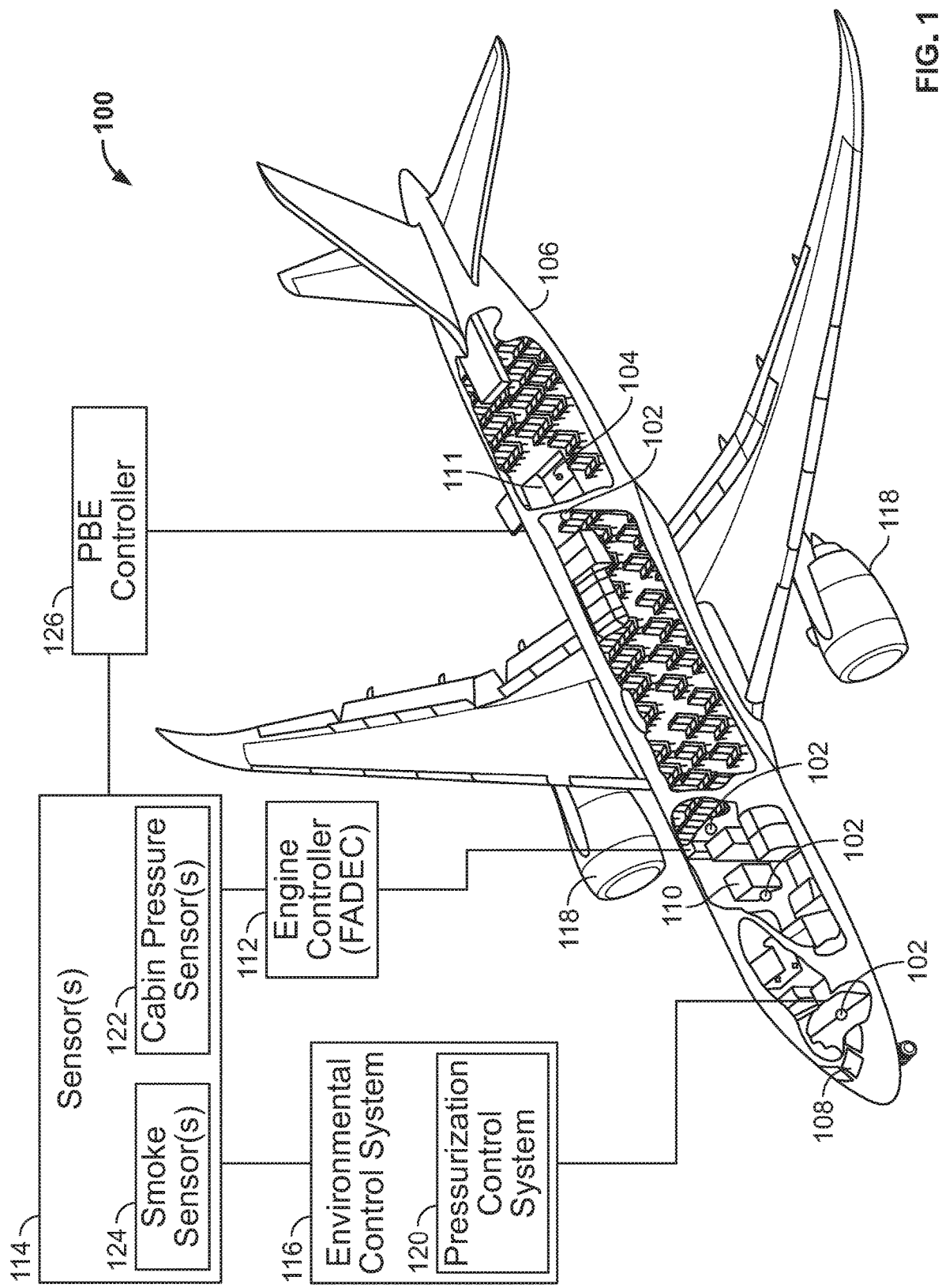
FIG. 1 illustrates an example aircraft having example portable breathing equipment in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft employ portable breathing equipment for crew members for use during emergency conditions. For example, during hazardous conditions (e.g., in-flight fire and/or low cabin pressure conditions), portable breathing equipment provides oxygen to a crew member using the portable breathing equipment. The amount of time needed to access the portable breathing equipment is critical. For example, from ten seconds up to two minutes of an in-cabin fire event, concentrations of hydrogen chloride (HCl) and hydrogen fluoride (HF) inside the cabin can be severely irritating to the eyes and respiratory tract. After two minutes of exposure, the likelihood of survival quickly diminishes.

Typically, to access portable breathing equipment, a crew member removes a lid from a container to access the portable breathing equipment, removes the portable breathing equipment from the cavity of the container, and manually tears open a foil package (e.g., a bag) to access the portable breathing equipment inside the foil package. The foil package is provided to prevent degradation of the portable breathing equipment and/or prevent debris or other contaminates (e.g., dust) from contaminating the portable breathing equipment while stored in the container. In some instances, portable breathing equipment has a shelf-life of approximately fifteen years. Thus, the foil package protects the portable breathing equipment while stored in the container. The process of opening the container to remove the portable breathing apparatus, tearing the foil package, removing the portable breathing equipment (e.g., a hood) from the foil lining, and applying the portable breathing equipment can take a crew member, on average, approximately twenty seconds. Such a delay exposes the crew members to the hazardous materials for a longer duration. Additionally, such a delay prolongs the crew member's ability to assist other passengers. For example, during emergency conditions, oxygen masks for passengers automatically deploy. However, passengers are required to place the oxygen mask on their face and may require assistance from flight crew member. Additionally, some known portable breathing equipment containers or boxes require a user to break (e.g., punch out) a portion of the container to remove the sealed smoke hood. Some such containers cannot be reused for subsequent use.

Example apparatus and related methods disclosed herein facilitate access to portable breathing equipment. For example, apparatus and related methods disclosed herein significantly decrease the time needed to access the portable breathing equipment during an emergency condition. In some instances, example apparatus and methods disclosed herein enable a crew member, on average, to access portable breathing equipment within ten seconds. Thus, example apparatus and methods disclosed herein enable a crew member to access portable breathing equipment in half the amount of time that it takes a crew member to access the above-mentioned known portable breathing equipment. This decrease in the amount of time needed to access the portable breathing apparatus is critical because exposure to certain hazardous material(s) (e.g., hydrogen chloride (HCl), hydrogen fluoride (HF)) for as a little as ten seconds can cause irritation to eyes, skin, lungs, etc. Thus, in some instances, a crew member can access the portable breathing equipment with minimal exposure to hazardous material(s) that can cause irritation to eyes, skin, lungs, etc.

FIG. 1 illustrates an example aircraft 100 that includes example portable breathing equipment (PBE) 102 constructed in accordance with the teachings of this disclosure. The PBE 102 are located at various locations inside a cabin 104 of a fuselage 106 of the aircraft 100. For example, one or more portable breathing equipment can be located in a cockpit 108, a crew rest area 110, an aft lounge 111, and/or any other location of the cabin for storing safety equipment.

The aircraft 100 of the illustrated example includes an engine controller 112 (e.g., a full authority digital engine (or electronics) control (FADEC) controller) that receives data from one or more sensors 114 to detect operating and/or environmental conditions of the aircraft 100 to control aspects of aircraft engine performance during operation (e.g., taxiing, take-off, climb, cruise, descent, landing) of the aircraft 100. For example, the engine controller 112 receives data and/or signals from the sensors 114 representative of current flight conditions including, for example, aircraft airspeed, altitude, a number of passengers in the cabin, air temperature, atmospheric pressure, cabin pressure, angle of attack, air density, throttle lever position, engine temperatures, engine pressures, and/or other parameter(s).

Additionally, during operation of the aircraft 100, an environmental control system 116 of the aircraft 100 provides pressurized air to the cabin 104 via, for example, an electric air compressor, bleed air from a turbo-compressor, bleed air provided from one or more compressor stages of one or more turbine engines 118, and/or any other air source for the environmental control system 116 of the aircraft 100. In turn, a cabin pressurization control system 120 controls and/or maintains air pressure inside the cabin (e.g., by modulating an outflow valve to exhaust or vent cabin air from the cabin 104). For example, during flight, atmospheric pressure decreases as flight altitude increases. The cabin pressurization control system 120 determines, obtains or otherwise uses a cabin pressure altitude schedule and pressure data from one or more cabin pressure sensors 122 to set or maintain cabin air pressure at a required or desired pressure (e.g., 11 psi during cruise) corresponding to a specific flight altitude of the aircraft 100. For example, during cruise, the cabin pressurization control system 120 of the illustrated example may regulate cabin air at a desired pressure between approximately 11 psi and 12 psi (i.e., a cabin altitude of between approximately 8000 feet to 6000 feet) when the aircraft 100 flies at altitudes between 30,000 and 40,000 feet, where the atmospheric air pressure is less than approximately 4.5 psi (e.g., example standard day air pressures at 30,000 and 40,000 feet are 4.36 and 2.72 psi, respectively). In some examples, the maximum cabin altitude cannot be less than a threshold of 8,000 feet or 10.9 psi.

In some examples, the sensors 114 can provide data representative of environmental and/or hazardous conditions inside the cabin 104. For example, the aircraft 100 of the illustrated example includes one or more smoke sensors 124 located inside the cabin 104. The smoke sensors 124 can sense or detect smoke caused by a fire in the cabin 104. In some examples, the aircraft 100 can include one or more hazardous or toxic material sensors located in the cabin 104 that sense, detect or otherwise measure air quality, hazardous chemicals, air temperature, angle of attack, etc. In some examples, the aircraft 100 can include any other sensor that can sense environmental and/or hazardous conditions inside the cabin 104.

Upon detection of a hazardous condition, the environmental control system116 activates and/or otherwise causes deployment of oxygen masks for the passengers in the cabin 104. For example, the environmental control system 116 receives data from the one or more sensors 114 to detect loss of cabin pressure, fire, and/or any other hazardous condition that requires deployment of oxygen masks. To detect a hazardous condition that requires use of the PBE 102, the aircraft 100 of the illustrated includes a PBE controller 126. To detect a hazardous condition, the PBE controller 126 receives one or more signals from the sensors 114 (e.g., the smoke sensors 124 and/or the cabin pressure sensors 122). Upon detection of a hazardous condition, the PBE controller 126 provides signals or commands to activate the PBE 102 located throughout the cabin 104. For example, the PBE controller 126 activates the PBE 102 upon detection of smoke caused by a fire in the cabin 104, loss of cabin pressure, and/or detection of any other hazardous condition (e.g., detection of toxic chemicals, etc.). As described in greater detail below, the PBE controller 126 activates the PBE 102 to provide flight crew members access to smoke hoods. In some examples, the environmental control system 116 can activate the PBE 102 upon deployment of the passenger oxygen masks. In some such examples, the PBE controller 126 can be integrated with the environmental control system 116 and/or may not be needed.

The example teachings of this disclosure are not limited to the aircraft 100 of FIG. 1. For example, the PBE 102 can be implemented with other types of aircraft such as, for example, military aircraft. In some examples, the PBE 102 disclosed herein can be implemented with other types of vehicles including, but not limited to, a ship, a submarine, a ground vehicle (e.g., a bus, a train, etc.) and/or any other vehicle(s). In some examples, the PBE 102 disclosed herein can be employed in buildings (e.g., schools, warehouses, high rise buildings, etc.) and/or other structures.

Figure 2:
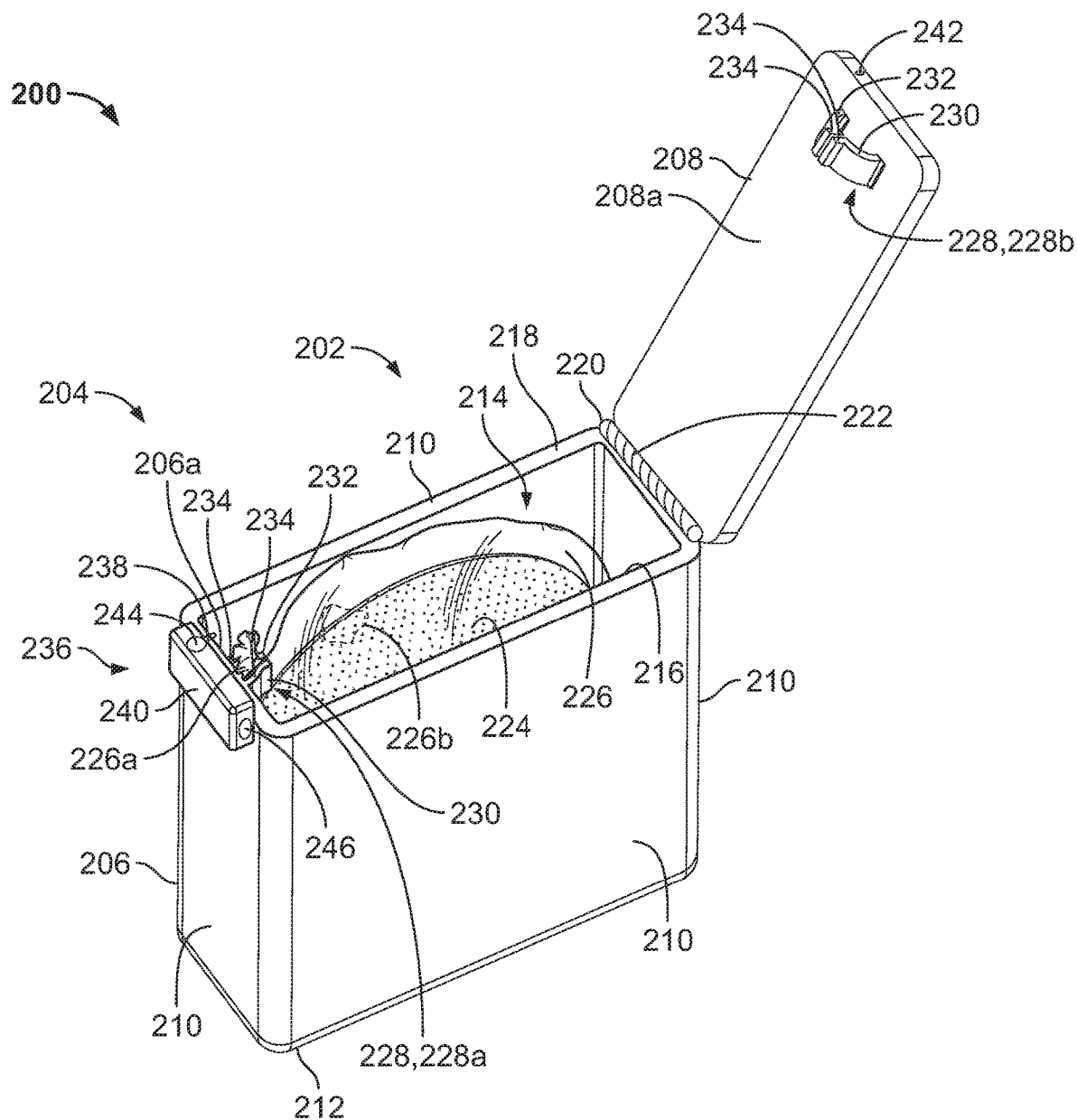
FIG. 2 is a perspective view of an example portable breathing equipment disclosed herein that can implement the example portable breathing equipment of FIG. 1.

FIG. 2 is a perspective view of an example portable breathing equipment PBE 200 disclosed herein. The PBE 200 of FIG. 2 can implement each of the PBE 102 of FIG. 1. The PBE 200 of FIG. 2 is shown in a partially assembled condition 202. The PBE 200 of FIG. 2 is a container 204 that includes a housing 206 and a cover 208. The housing 206 includes side walls 210 (e.g., vertical walls in the orientation of FIG. 2) and a support wall 212 (e.g., a bottom surface or horizontal wall) that define a cavity 214. The cavity 214 is accessible via an opening 216 formed at an end 218 (e.g., opposite the support wall 212, a top end, an upper end, etc.) of the housing 206.

To cover the opening 216 and/or enclose the cavity 214, the container 204 includes the cover 208 (e.g., a lid). The cover 208 moves relative to the housing 206 between a closed position (e.g., an example closed position 302 of FIG. 3) an open position (e.g., an example open position 402 of FIG. 4). The cover 208 of the illustrated example is movably or pivotally coupled to the housing 206 to via a hinge 220. Additionally, the container 204 includes a biasing element 222 (e.g., a torsion spring) to bias the cover 208 toward the open position 402. Thus, the container 204 includes a spring-based hinge (e.g., a spring-loaded hinge) to movably couple the cover 208 to the housing 206. In some examples, the hinge 220 provides means for pivotally or movably coupling the cover 208 to the housing 206 and the biasing element 222 provides means for biasing the cover 208 toward the open position 402 relative to the housing 206.

The container 204 of the illustrated example houses a smoke hood 224 via the cavity 214 of the housing 206. To prevent contaminates or debris from entering the smoke hood 224 when the smoke hood 224 is stored in the container 204, the smoke hood 224 of the illustrated example is positioned in a bag or wrapper 226 (e.g., a sealed bag, a foil wrapper, etc.). The wrapper 226 of the illustrated example is a bag composed of aluminum foil. The wrapper encloses (e.g., completely encloses, encases or otherwise seals) the smoke hood 224. The wrapper 226 and the smoke hood 224 are positionable in the cavity 214 of the housing 206. In some examples, the container 204 provides means for containing the smoke hood 224.

As described in greater detail below, to allow access to the smoke hood 224 during an emergency condition, the PBE 200 of the illustrated example causes the wrapper 226 to tear open (e.g., automatically) in response to the cover 208 moving from the closed position 302 to the open position 402. To enable the wrapper 226 to tear open in response to the cover 208 moving from the closed position 302 to the open position 402, the PBE 200 of the illustrated example includes a retainer assembly 228 (e.g., tear or tearing mechanism). The retainer assembly 228 of the illustrated example receives (e.g., attaches to) a first portion 226a of the wrapper 226 and a second portion 226b of the wrapper 226 different than the first portion 226a during assembly of the PBE 200. The retainer assembly 228 includes a first retainer 228a coupled to the housing 206 and a second retainer 228b coupled to the cover 208. The first retainer 228a is a first clip that protrudes from an inner surface 206a of the housing 206 (e.g., adjacent the end 218) and the second retainer 228b is a second clip that protrudes from an inner surface 208a of the cover 208. For example, the first and second retainers 228a, 228b are cantilevered from the respective inner surfaces 208a, 208b. Each of the first and second retainers 228a, 228b includes a first prong 230 and a second prong 232 that form a grip or clamp 234. The first and second prongs 230, 232 are biased toward each other to provide a clamping force to the wrapper 226 when the wrapper 226 is positioned in the respective first and second retainers 228a, 228b. For example, the first retainer 228a retains or grips the first portion 226a of the wrapper 226 and the second retainer 228b retains or grips the second portion 226b of the wrapper 226. In some examples, the first and second prongs 230, 232 can include an elastomeric material (e.g., a rubber material) adjacent the ends forming the clamp 234 to increase a frictional or retaining force of the respective retainers 228a, 228b.

To enable the first and second retainers 228a, 228b to receive the wrapper 226, the first and second prongs 230, 232 can flex relative to each other. During assembly of the PBE 200, the first and second prongs 230, 232 of the first retainer 228a can flex away from each other to receive the first portion 226a of the wrapper 226 and the first and second prongs 230, 232 of the second retainer 228b can flex away from each other to receive the second portion 226b of the wrapper 226. In some examples, the first portion 226a of the wrapper 226 can be a first tab and the second portion 226b of the wrapper 226 can be a second tab. In some such examples, the first tab couples to the first retainer 228a and the second tab couples to the second retainer 228b. In some examples, the retainer assembly 228 provides means for attaching the first portion 226a of the wrapper 226 to the housing 206 and the second portion 226b of the wrapper 226 to the cover 208.

To maintain the cover 208 in the closed position 302, the PBE 200 of the illustrated example includes a latch assembly 236. The latch assembly 236 includes a latch 238 and an actuator 240. The actuator 240 moves the latch 238 between a latched position to retain the cover 208 in the closed position 302 and an unlatched position to enable the cover 208 to move to the open position 402. The latch 238 of the illustrated example is a pin movable relative to an opening or recess 242 of the cover 208. In the illustrated example, the pin is biased toward the latched position via a biasing element (e.g., a spring-loaded pin). In the latched position, the latch 238 engages (e.g., is at least partially inserted in) the recess 242 of the cover 208 to retain the cover 208 in the closed position 302 relative to the housing 206. In the unlatched position, the latch 238 disengages (e.g., is fully removed from) the recess 242 of the cover 208 to allow the cover 208 to move to the open position 402. The actuator 240 of the illustrated example moves the latch 238 between the latched position and the unlatched position. The actuator 240 of the illustrated example is a solenoid actuator. However, in other examples, the actuator 240 can be a motor, a linear actuator, and/or any other actuator for moving the latch 238. The actuator 240 moves the latch between the latched position and the unlatched position in response to signals provided by the PBE controller 126 of FIG. 1. The actuator 240 can be communicatively coupled to the PBE controller 126 wirelessly, via wires, and/or any other communication protocol.

Additionally, the latch assembly 236 of the illustrated example includes a manual override 244 (e.g., a bush button or bypass) that enables movement of the cover 208 to the open position 402 in the absence of input from the PBE controller 126. For instance, a crew member can move the latch 238 of the latch assembly 236 to the unlatched position via the manual override 244 to cause the cover 208 to move to the open position 402 (i.e., without input from the PBE controller 126). In some examples, the latch assembly 236 provides means for latching and means for unlatching the cover 208 to the housing 206. To direct a crew member's attention to the PBE 200 during an emergency condition, the PBE 200 (e.g., the latch assembly 236) of the illustrated example includes a visual and/or audible indicator 246 that activates when the cover 208 moves to the open position 402.

Figure 3:
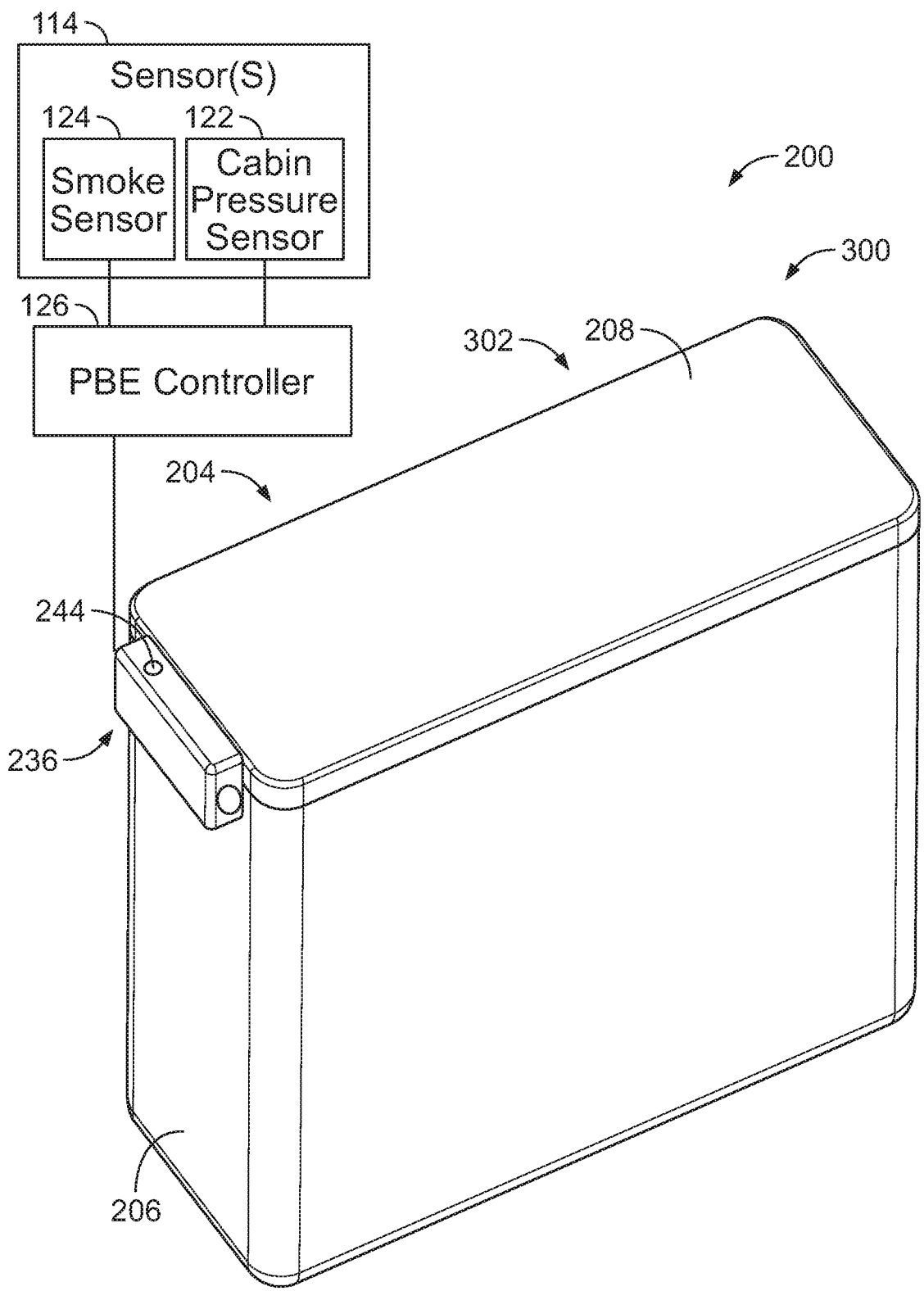
FIG. 3 is a perspective view of the example portable breathing equipment of FIG. 2 shown in an example closed position.

FIG. 3 is a perspective view of the PBE 200 of FIG. 2 shown in the closed position 302. Specifically, the PBE 200 is shown in an assembled state 300. In the assembled state 300, the wrapper 226 and the smoke hood 224 have been positioned in the cavity 214 of the housing 206, the first and second portions 226a, 226b of the wrapper 226 have been coupled to the respective first and second retainers 228a, 228b, and the cover 208 is in the closed position 302. In the closed position 302, the cover 208 seals, encloses or otherwise covers the smoke hood 224 positioned in the cavity 214 of the housing 206. The latch assembly 236 maintains the cover 208 in the closed position 302. For example, the latch 238 (FIG. 2) of the latch assembly 236 engages (e.g., is at least partially inserted in) the recess 242 (FIG. 2) of the cover 208.

Figure 4:
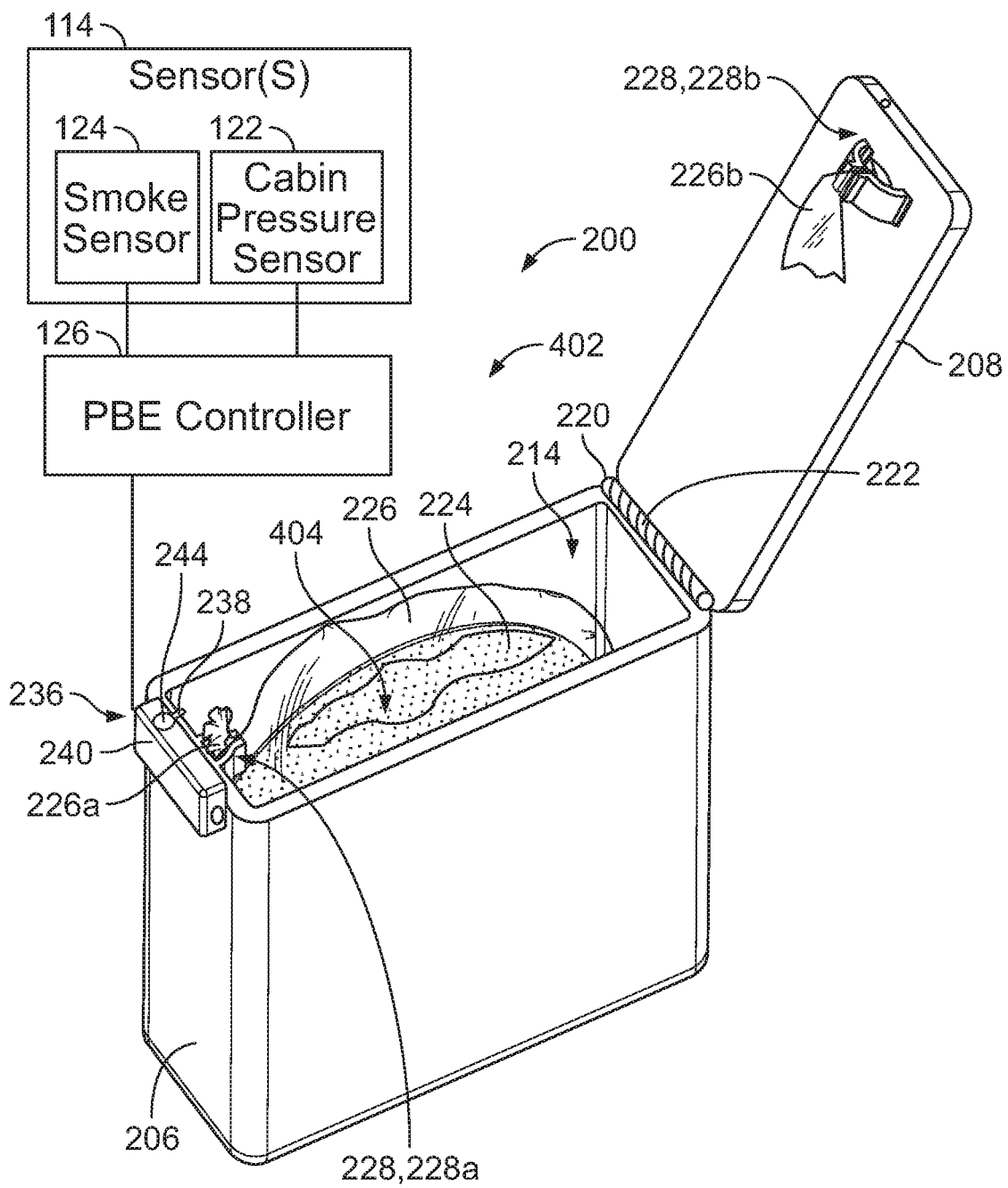
FIG. 4 is a perspective view of the example portable breathing equipment of FIG. 2 shown in an example open position.

FIG. 4 is a perspective view of the PBE 200 of FIG. 3 shown in the open position 402. As described in greater detail below, the actuator 240 of the latch assembly 236 is responsive to inputs provided by the PBE controller 126 based on outputs from the sensors 114 (e.g., the smoke sensor 124 and/or the cabin pressure sensor 122). In some examples, the latch assembly 236 is responsive to input provided by the manual override 244. In response to an input from the PBE controller 126 that is indicative of an emergency condition in the cabin 104, the actuator 240 causes the latch 238 to move to the unlatched position. When the latch moves to the unlatched position, the biasing element 222 causes the cover 208 to move to the open position 402. In response to the cover 208 moving from the closed position 302 to the open position 402, the retainer assembly 228 causes the wrapper 226 to tear open (e.g., automatically) to provide an access opening 404 (e.g., perforation) that enables access to the smoke hood 224. The access opening 404 is provided automatically upon movement of the cover 208 from the closed position 302 to the open position 402 without user (e.g., crew member) effort. To provide the access opening 404, the first portion 226a of the wrapper 226 is retained by the first retainer 228a and the second portion 226b of the wrapper 226 is retained by the second retainer 228b. The frictional forces provided by the first and second retainers 228a, 228b to the respective first and second portions 226a, 226b causes the first and second portions 226a, 226b to remain attached to the respective housing 206 and the cover 208 as the cover 208 moves toward the open position 402 and cause the wrapper 226 to tear to provide the access opening 404. In some examples, the wrapper 226 can include a line of weakness (e.g., perforated line of weakness) along an area or perimeter defining the access opening 404 to facilitate formation of the access opening 404 when the cover 208 moves to the open position 402. The retainer assembly 228 provides the access opening 404 without assistance or involvement from a crew member, passengers or other flight crew personnel. In some instances, the PBE 200 of the illustrated example provides the access opening 404 prior to a crew member reaching the PBE 200. The access opening 404 enables a crew member to access the smoke hood 224 that was sealed in the wrapper 226 prior to the cover 208 moving to the open position 402 (e.g., the closed position 302 of FIG. 3). In some examples, the retainer assembly 228 (e.g., the first retainer 228a and the second retainer 228b) provides means for automatically providing the access opening 404 and/or means for providing a tear or tearing mechanism.

After the smoke hood has been used, the container 204 can be reused. For example, a new or different smoke hood sealed in a wrapper can be positioned in the cavity 214 and the cover can be moved to the closed position.

Figure 5:
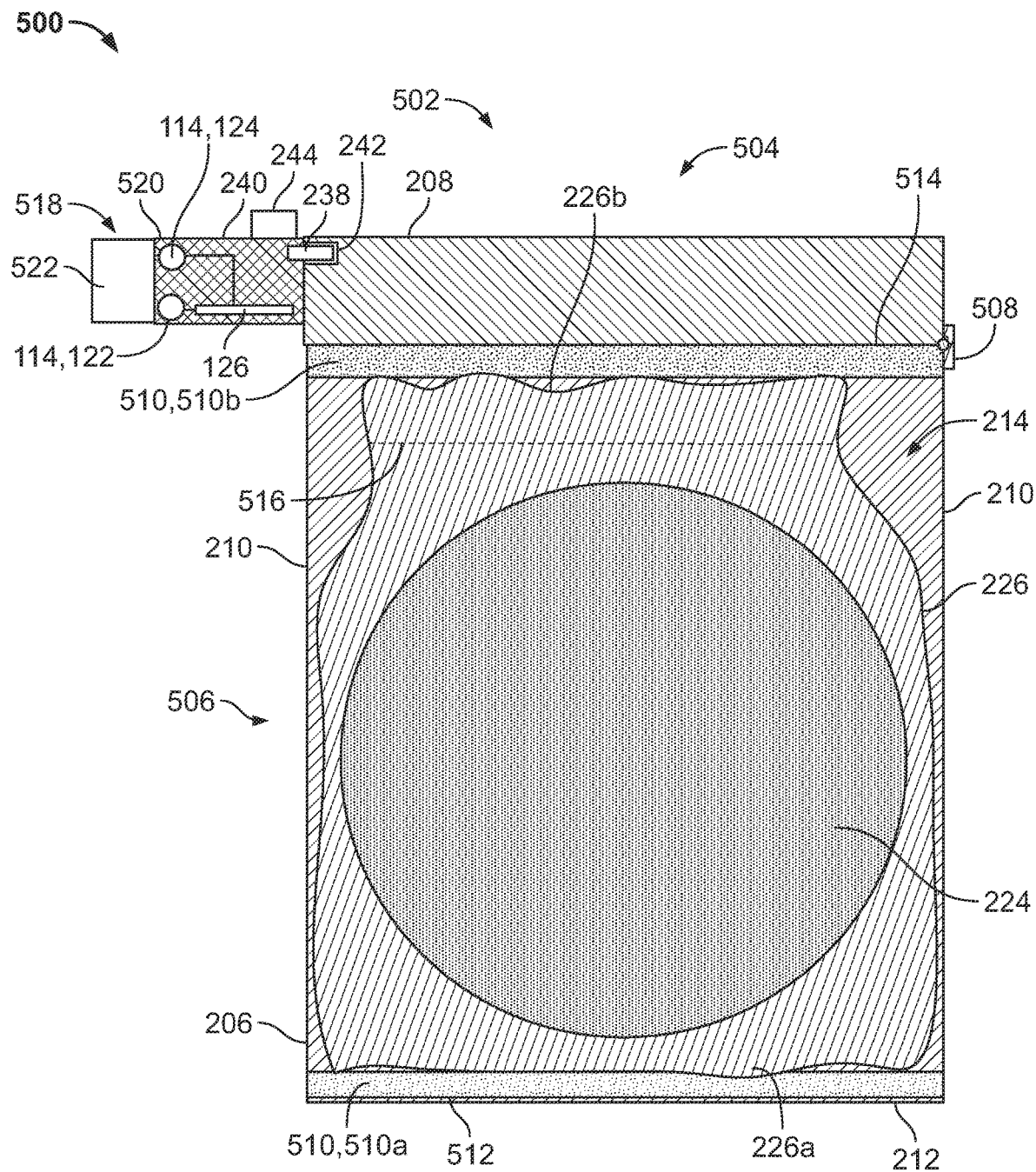
FIG. 5 is a cross-sectional view of another example portable breathing equipment disclosed herein that can implement the example portable breathing equipment of FIG. 1.

FIG. 5 is another example PBE 500 disclosed herein that can implement the PBE 102 of FIG. 1. The example PBE 500 of FIG. 5 is shown in an assembled state 502 and shown in a closed position 504. Those components of the PBE 500 of FIG. 5 that are substantially similar or identical to the components of the PBE 102 and the PBE 200 described above and that have functions substantially similar or identical to the functions of those components will not be described in detail again below. Instead, the interested reader is referred to the above corresponding descriptions. To facilitate this process, identical reference numbers will be used for like structures. For example, the PBE 500 of the illustrated example includes a container 506 that includes a housing 206 and a cover 208. The container 506 includes side walls 210 and a support wall 212 to define a cavity 214 configured to receive a smoke hood 224 positioned in a wrapper 226.

The PBE 500 of the illustrated example includes a spring-loaded hinge 508 to pivotally couple the cover 208 to the housing 206. The spring-loaded hinge 508 of the illustrated example is a piano-style, spring-loaded hinge. The PBE 500 includes a retainer assembly 510 that includes a first retainer 510a and a second retainer 510b. The first retainer 510a is at least partially positioned on an inner surface 512 of the support wall 212 and the second retainer 510b is at least partially positioned on an inner surface 514 of the cover 208. The first retainer 510a of the illustrated example retains a first portion 226a of the wrapper 226 and the second retainer 510b of the illustrated example retains a second portion 226b of the wrapper 226 when the wrapper 226 is positioned in the cavity 214 and the cover 208 is positioned to the closed position 504.

The first retainer 510a and the second retainer 510b of the illustrated example are chemical fasteners (e.g., adhesive). In some examples, the first retainer 510a is a first strip of adhesive and the second retainer 510b is a second strip of adhesive. In some examples, the first and second retainers 510a, 510b are hook-and-loop fasteners (e.g., Velcro®). In some such examples, the wrapper 226 supports or includes portions of the hook-and-loop fasteners. In some examples, a resilient member (e.g., a string, a rope, a chain, etc.) having a first end coupled (e.g., fixed or attached) to the inner surface 512 of the cover 208 and a second end opposite the first end attached to the wrapper 226. In some examples, the retainer assembly 510 provides means for retaining or tearing the wrapper 226 in response to the cover 208 moving to an open position. To facilitate formation of an access opening in response to the cover 208 moving to an open position, the wrapper 226 of the illustrated example includes a line of weakness 516 (e.g., a perforated portion).

The container 506 includes a latch assembly 518 to retain the cover 208 in the closed position 504. The latch assembly 518 of the illustrated example includes a latch 238, an actuator 240, sensors 114 (e.g., a smoke sensor 124 and a cabin pressure sensor 122), and a PBE controller 126. In other words, the latch 238, the actuator 240, the smoke sensor 124, the cabin pressure sensor 122 and the PBE controller 126 are provided with or carried by the container 506. For example, the latch 238, the actuator 240, the smoke sensor 124, the cabin pressure sensor 122 and the PBE controller 126 are contained within a common housing 520 that is coupled or attached to the housing 206. A power source 522 (e.g., a battery) provides power to the sensors 114 and the actuator 240. In some such examples, the PBE 500 of the illustrated example is a stand-alone unit that works independently from the environmental control system 116 and/or the engine controller 112 of FIG. 1.

Although each example PBE (e.g., the PBE 102, 200, 500) disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. For example, one or more features of one example PBE can be combined with another feature of another example PBE disclosed herein.

Figure 6:
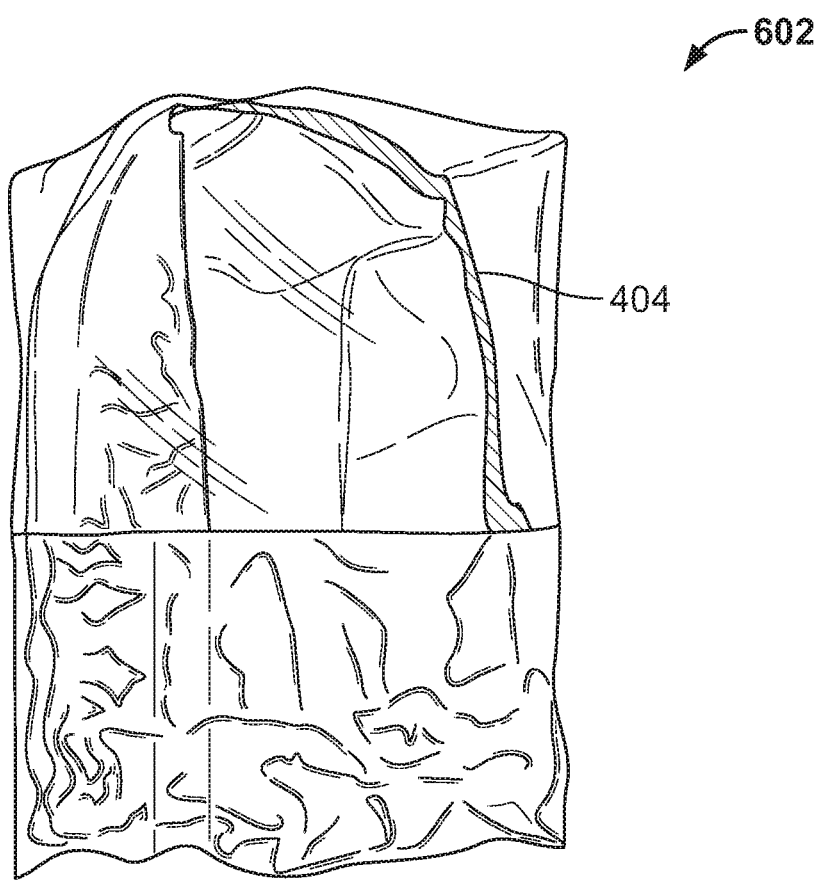
FIG. 6 illustrates an example wrapper and a smoke hood that can implement the example portable breathing equipment of FIGS. 1-5.
Figure 6:
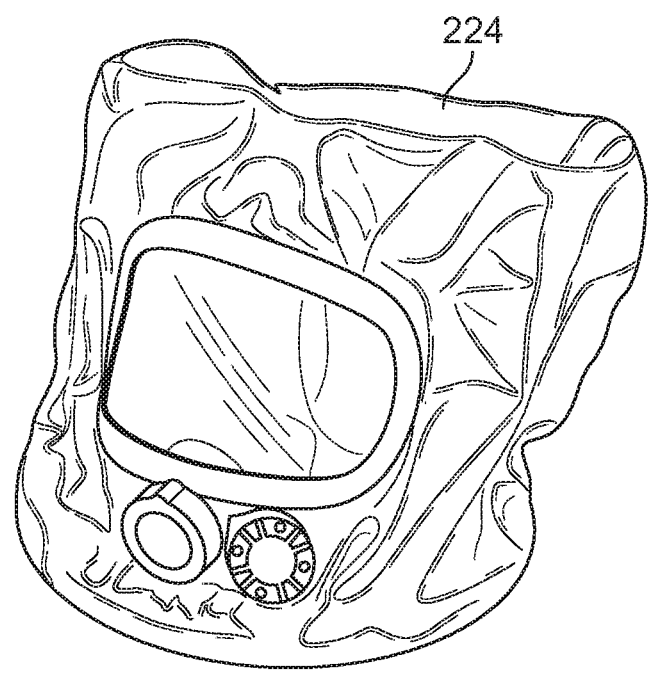

FIG. 6 illustrates an example smoke hood 224 that has been removed from an example wrapper 602. The wrapper 602 can implement the example wrapper 226 of FIGS. 2-5. The wrapper 226 has been torn to provide the access opening 404 via a retraining assembly (e.g., the retainer assembly 228 of FIGS. 2-4 or the retainer assembly 510 of FIG. 5) of a PBE (e.g., the PBE 200 and/or the PBE 500).

Figure 7:
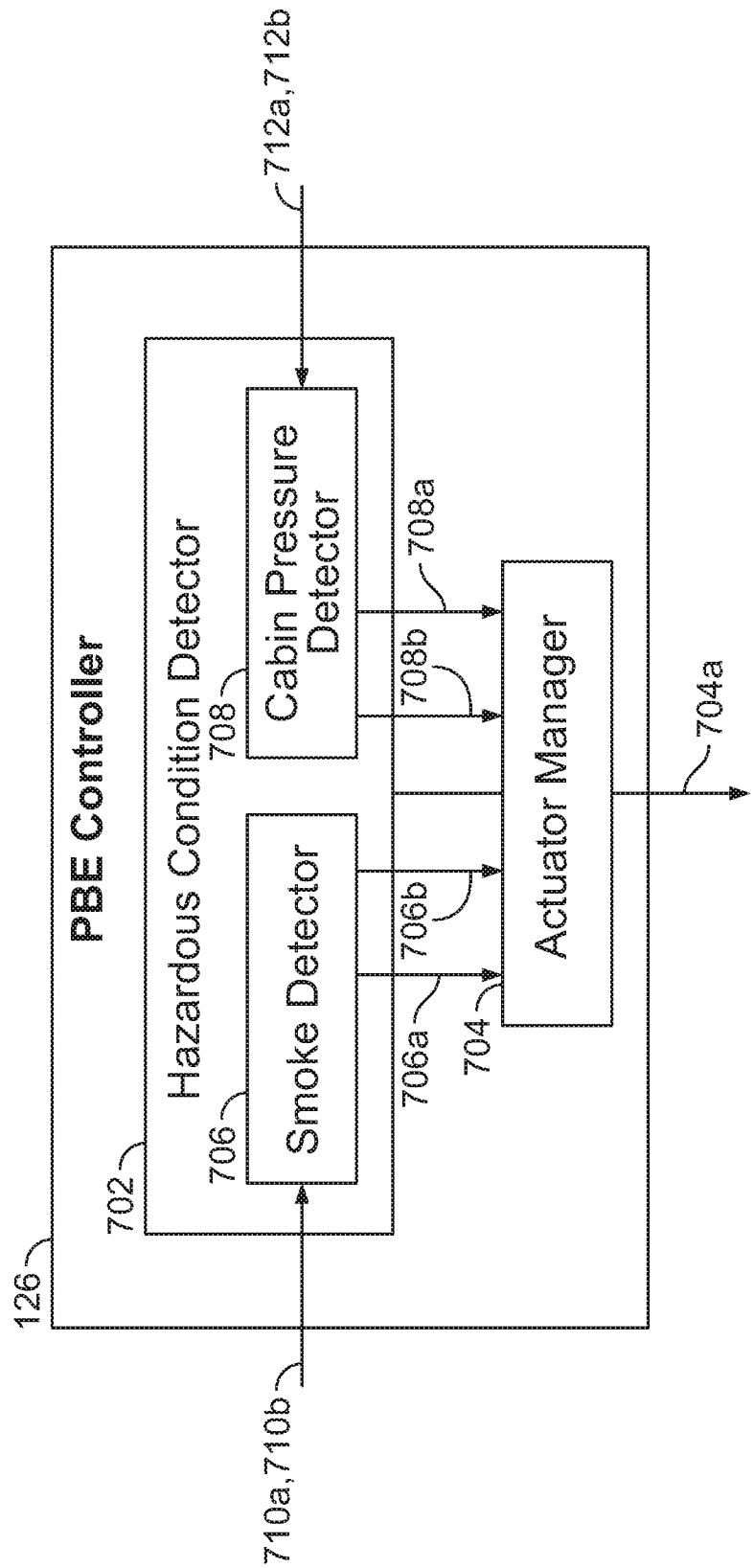
FIG. 7 is block diagram of an example portable breathing equipment controller of FIGS. 1-5.

FIG. 7 is a block diagram representative of an example implementation of the PBE controller 126 of FIGS. 1-5 disclosed herein. The example PBE controller 126 of the illustrated example includes an example hazardous condition detector 702 and an example actuator manager 704. In this example, the hazardous condition detector 702 includes a smoke detector 706 and a cabin pressure detector 708. In some examples, the hazardous condition detector 702, the actuator manager 704, the smoke detector 706 and the cabin pressure detector 708 are in communication (e.g., via a communication bus, by writing and reading data from a memory, etc.).

The PBE controller 126 of the illustrated example determines if a hazardous or emergency condition is present in the cabin 104 of the fuselage 106. To monitor and/or identify a hazardous condition, the PBE controller 126 of the illustrated example includes the hazardous condition detector 702. To monitor and/or identify hazardous conditions, the hazardous condition detector 702 receives, retrieves and/or obtains one or more data signals from the sensors 114. For example, the hazardous condition detector 702 of the illustrated example can determine a non-hazardous condition (e.g., a non-fire event) in the cabin 104 based on a received first output signal having a first value (e.g., a bit value of one) and can determine a hazardous condition (e.g., a fire event) based on a received second output signal having a second value (e.g., a bit value of zero) different than the first value. The hazardous condition detector 702 of the illustrated example monitors for fire and loss of cabin pressure in the cabin 104 of the fuselage 106. However, in other examples, the hazardous condition detector 702 can include, for example, a toxic chemical detector, a temperature detector, and/or any hazardous condition detector. In some examples, the hazardous condition detector 702 includes one or more comparators, analog-to-digital converters, etc.

In the illustrated example, to monitor and/or identify a fire condition, the hazardous condition detector 702 includes the smoke detector 706. The smoke detector 706 receives data signals from the smoke sensor 124. For example, the smoke detector 706 of the illustrated example receives either a first smoke output signal 710a or a second smoke output signal 710b. For example, the smoke detector 706 can determine a hazardous condition (e.g., a fire event) in the cabin 104 based on a received first smoke output signal 710a having a first value representative of smoke being present in the cabin 104, and can determine a non-hazardous condition (e.g., a non-fire event) based on a received second smoke output signal 710b having a second value different than the first value representative of an absence of smoke in the cabin 104. In some examples, the first smoke output signal 710a is a bit value of one (e.g., a logic "1") signal, a first voltage (e.g., 5 volts), a current value etc., and the second smoke output signal 710b is a bit value of zero (e.g., a logic "0"), a second voltage (e.g., zero voltage), a second current value (e.g., zero current), etc.

To monitor and/or identify for a low-pressure condition, the hazardous condition detector 702 includes the cabin pressure detector 708. The cabin pressure detector 708 receives data signals from the cabin pressure sensor 122. For example, the cabin pressure detector 708 of the illustrated example receives either a first pressure output signal 712a or a second pressure output signal 712b from the cabin pressure sensor 122. For example, the cabin pressure detector 708 can determine a hazardous condition (e.g., a low-pressure event) in the cabin 104 based on a received first pressure output signal 712a having a first value representative of a low-pressure condition being present in the cabin 104, and can determine a non-hazardous condition (e.g., a non-low pressure event) based on a received second pressure output signal 712b having a second value different than the first value representative of an absence of a low-pressure event in the cabin 104. In some examples, the first pressure output signal 712a is a bit value of one (e.g., a logic "1") signal, a first voltage (e.g., 5 volts), a current value etc., and the second pressure output signal 712b is a bit value of zero (e.g., a logic "0"), a second voltage (e.g., zero voltage), a second current value (e.g., zero current), etc.

Based on the smoke sensor data and the cabin pressure data provided by the smoke detector 706 and the cabin pressure detector 708, respectively, the actuator manager 704 of the illustrated example controls the actuator 240 of the latch assembly 236, 518. For example, the smoke detector 706 provides a first smoke input signal 706a to the actuator manager 704 in response to determining the presence of a fire and provides a second smoke input signal 706b to the actuator manager 704 in response to determining the absence of a fire. Similarly, the cabin pressure detector 708 provides a first pressure input signal 708a to the actuator manager 704 in response to determining a low-pressure condition in the cabin 104 and provides a second pressure input signal 708b in response to determining a non-low-pressure condition in the cabin 104. Each of the first smoke input signal 706a and the first pressure input signal 708a can be a logic "1" and/or any other signal, and each of the second smoke input signal 706b and the second pressure input signal 708b can be a logic "0" and/or any other signal The actuator manager 704 outputs a command signal 704a in response to receiving the first smoke input signal 706a or the first pressure input signal 708a. The command signal 704a causes the actuator 240 to activate to move the latch 238 to the unlatched position to enable the cover 208 to move the open position 402. The command signal 704a can be a bit value, a current signal, a voltage signal, a logic signal and/or any other signal(s).

As noted above, the PBE controller 126 can be located remotely from the PBE 102 (e.g., the PBE 200) or can be carried by the PBE 102 (e.g., the PBE 500). The PBE controller 126 can be in communication with the sensors 114 (e.g., the smoke sensor 124, the cabin pressure sensor 122, etc.) and the latch assembly 236 via a network (e.g., a process control network). However, the example network may be implemented using any suitable wired and/or wireless network(s) including, for example, one or more data buses, one or more process control networks, one or more Local Area Networks (LANs), one or more wireless LANs, one or more cellular networks, one or more fiber optic networks, one or more private networks, one or more public networks, etc. The network enables the example sensors 114 and the latch assembly 236 to be in communication with the PBE controller 126. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
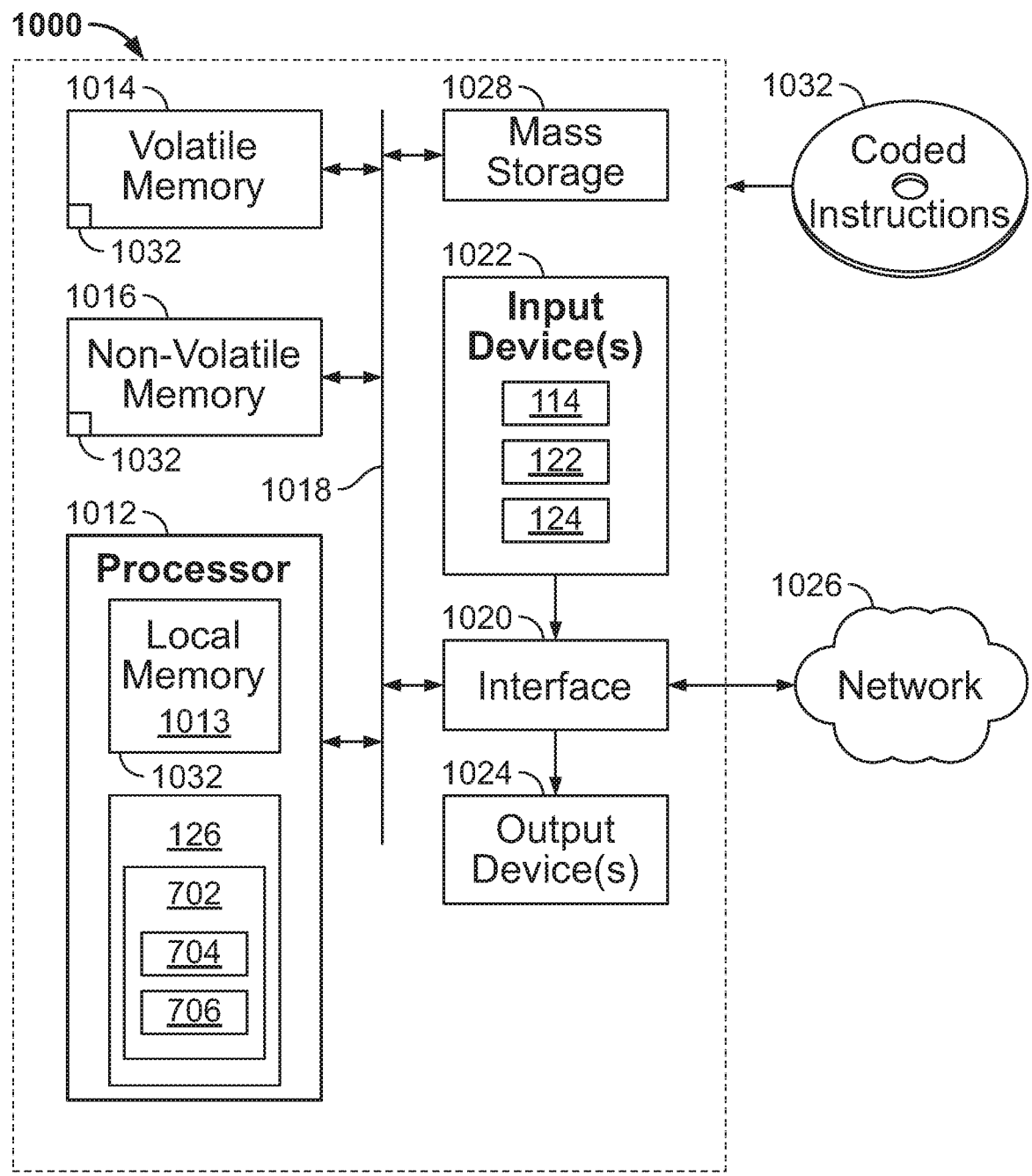
FIG. 10 is a block diagram of an example processor platform capable of executing the method of FIG. 8 to implement the example portable breathing equipment controller of FIGS. 1-5.

In some examples, the PBE controller 126 includes one or more processing platforms and can include one or more processors such as an example processor 1000 of FIG. 10. In some examples, the PBE controller 126 includes one or more logic circuits (e.g., a switch, a logic gate, etc.).

While an example manner of implementing the PBE controller 126 of FIGS. 1-5 is illustrated in FIG. 7, one or more of the elements, processes and/or devices illustrated in FIG. 7 may be combined, divided, re-arranged, omitted, eliminated and/or implemented in any other way. Further, the hazardous condition detector 702, the actuator operator 704, the smoke detector 706 and the cabin pressure detector 708 and/or, more generally, the example PBE controller 126 of FIG. 7 may be implemented by hardware, software, firmware and/or any combination of hardware, software and/or firmware. Thus, for example, any of the hazardous condition detector 702, the actuator operator 704, the smoke detector 706 and the cabin pressure detector 708 and/or, more generally, the example PBE controller 126 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the hazardous condition detector 702, the actuator operator 704, the smoke detector 706 and the cabin pressure detector 708 is/are hereby expressly defined to include a non-transitory computer readable storage device or storage disk such as a memory, a digital versatile disk (DVD), a compact disk (CD), a Blu-ray disk, etc. including the software and/or firmware. Further still, the example PBE controller 126 of FIG. 7 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
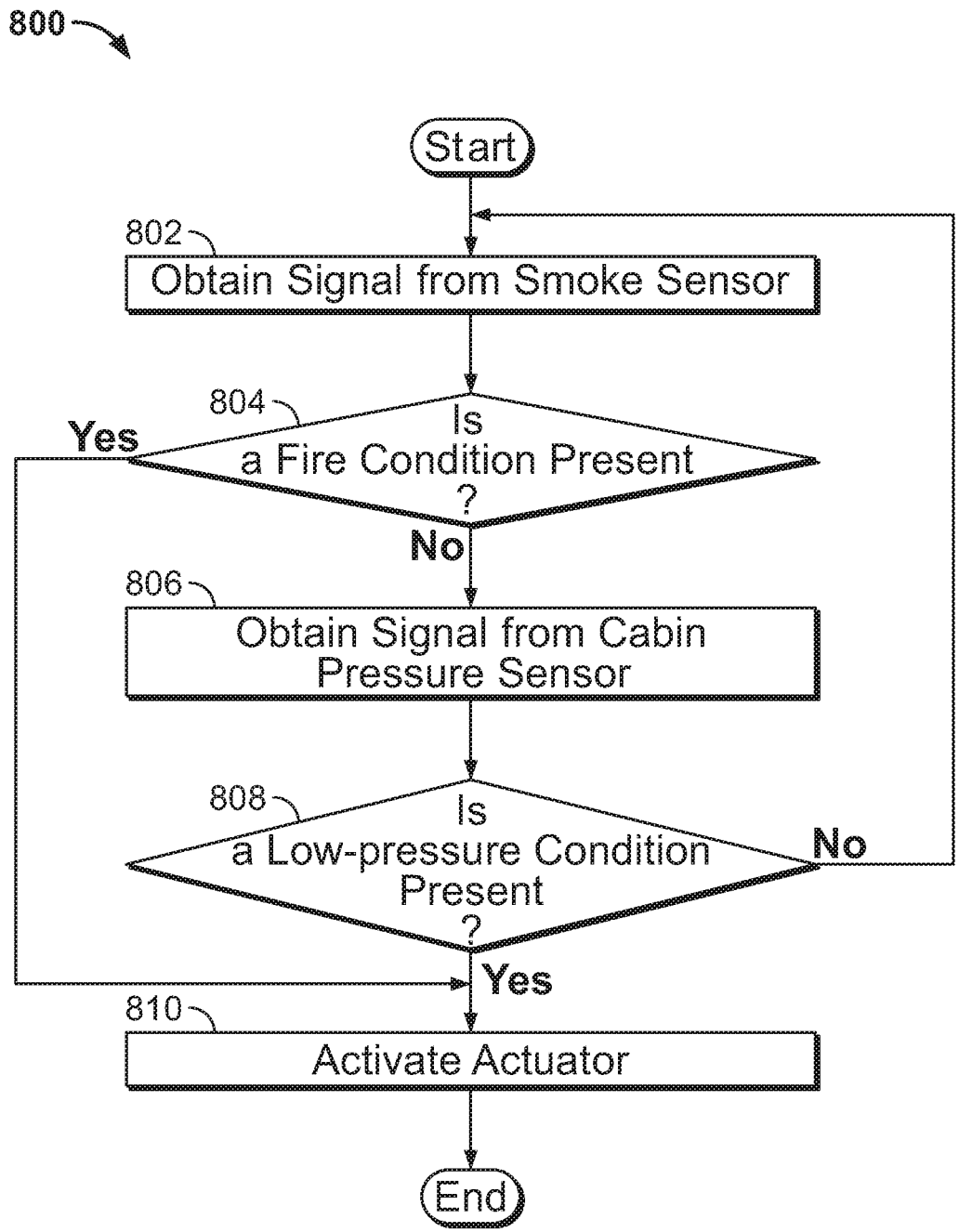
FIG. 8 is a flowchart representative of an example method that may be executed to implement the portable breathing equipment controller of FIG. 7.

A flowchart representative of example hardware logic, machine readable instructions, hardware implemented state machines, and/or any combination thereof for implementing the PBE controller 126 of FIG. 7 is shown in FIG. 8. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 8, many other methods of implementing the example PBE controller 126 can alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The method 800 of FIG. 8 begins by the smoke detector 706 obtaining or receiving a signal from the smoke sensor 124 (block 802). For example, the smoke detector 706 receives the first smoke output signal 710a or the second smoke output signal 710b.

Based on the received signals from the smoke sensor 124, the smoke detector 706 determines the presence of a fire condition (block 804). If at block 804 the smoke detector 706 does not detect a fire condition, the process continues to block 806.

At block 806, the cabin pressure detector 708 obtains or receives a signal from the cabin pressure sensor 122 (block 802). For example, the cabin pressure detector 708 receives the first pressure output signal 712a or the second pressure output signal 712b.

Based on the received signals from the cabin pressure sensor 122, the cabin pressure detector 708 determines a presence of pressure of a low-pressure condition (block 808). If at block 808 the cabin pressure detector 708 determines that a low-pressure condition does not exist in the cabin 104, the process returns to block 802.

If at block 804 the smoke detector 706 detects the presence of a fire condition and/or if the at block 808 the cabin pressure detector 708 detects the presence of a low-pressure condition, the actuator manager 704 causes the actuator 240 to active (block 810). For example, the actuator manager 704 activates the actuator 240 to move the cover 208 to the open position 402 relative to the housing 206. For example, the actuator manager 704 provides the command signal 704a to cause the actuator 240 to active.

In some examples, the PBE controller 126 determines whether to persist and/or otherwise continue monitoring the cabin 104. For example, the PBE controller 126 can determine to discontinue monitoring based on a user input, receiving continuing communication (e.g., a sensor information, etc.) from a sensor communicatively coupled to the PBE controller 126, etc.

Figure 9:
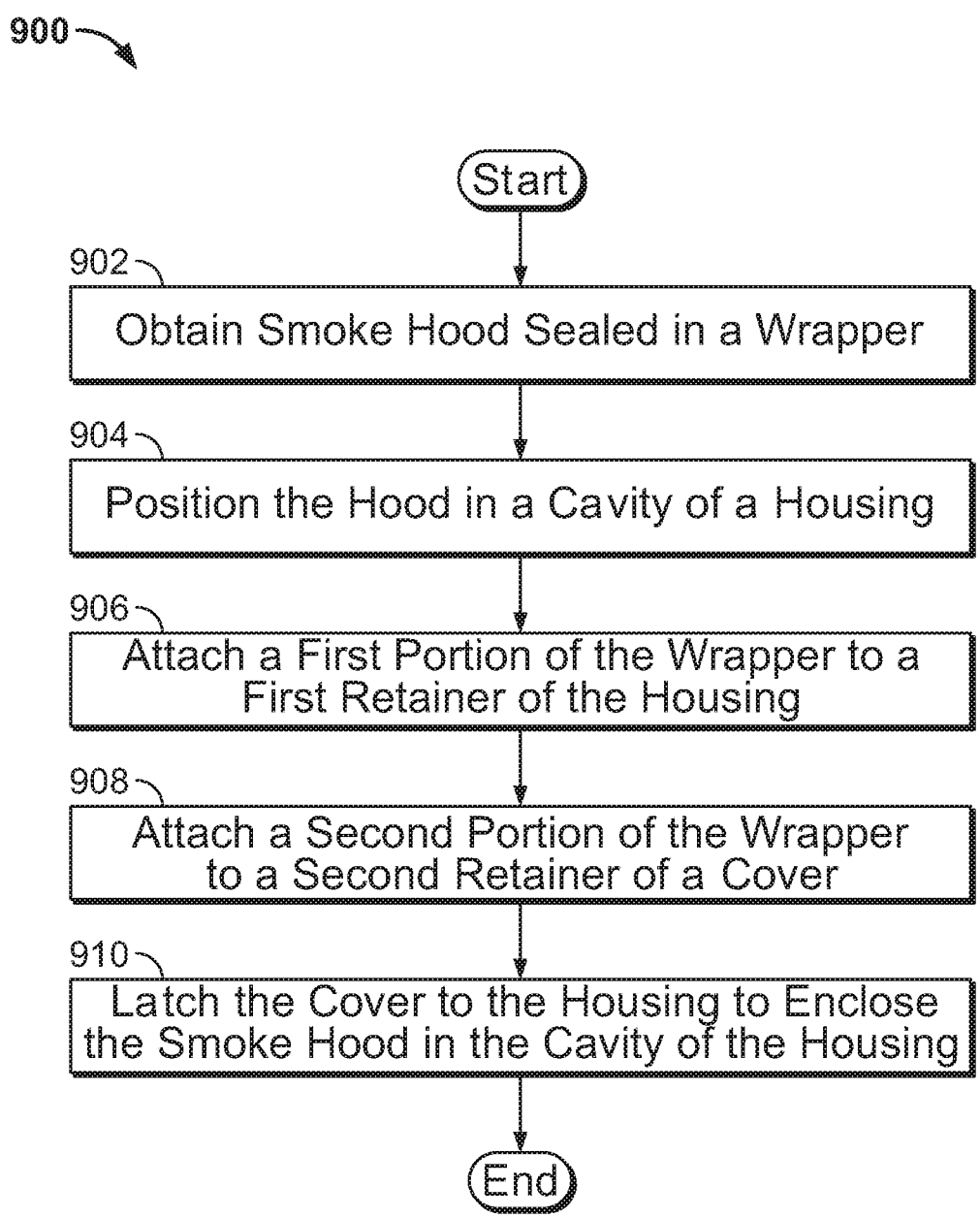
FIG. 9 is a flowchart representative of an example method of assembling the example portable breathing equipment of FIGS. 1-5.

FIG. 9 is a flowchart of an example method 900 for assembling a PBE (e.g., the PBE 102, 200, 500) disclosed herein. The method begins by obtaining a smoke hood 224 sealed in the wrapper 226 (block 902) and positioning the smoke hood 224 sealed in the wrapper 226 in a cavity 214 of a housing 206 (block 904). A first portion 226a of the wrapper 226 attaches to a first retainer 228a, 510a of the housing 206 (block 906). A second portion 226b of the wrapper 226 attaches to a second retainer 228b, 510b of the cover 208 (block 908). The cover 208 then latches to the housing 206 to enclose the smoke hood 224 and the wrapper 226 in the housing 206 (block 910).

FIG. 10 is a block diagram of an example processor platform 1000 structured to execute the instructions of FIG. 8 to implement the PBE controller 126 of FIGS. 1-5. The processor platform 1000 can be, for example, a server, a personal computer, a workstation, a self-learning machine (e.g., a neural network), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the hazardous condition detector 702, the actuator manager 704, the smoke detector 706 and the cabin pressure detector 708.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, one or more sensors 114 (e.g., a hazardous sensor), a smoke sensor 124, a cabin pressure sensor 122.

One or more output devices 1024 are also connected to the interface circuit 1020 of the illustrated example. The output devices 1024 can be implemented, for example, by display devices (e.g., a light emitting diode (LED), an organic light emitting diode (OLED), etc. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 8 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture improve portable breathing equipment for use with aircraft. Specifically, the example apparatus and methods disclosed herein improve (e.g., decrease by half) a time required to access crew portable breathing equipment. Specifically, the example apparatus and methods disclosed herein enable a housing to open automatically based on detection of an in-flight fire or low cabin pressure condition in the cabin. Thus, the example apparatus and methods disclosed herein eliminate the need for manually opening a crew portable breathing equipment container during emergency conditions. Additionally, the container automatically tears or opens a sealed bag containing the smoke hood when the container moves to an open position. Additionally, unlike known portable breathing equipment containers, the example containers can be reusable.

At least some of the examples include one or more features and/or benefits including, but not limited to, the following:

Example 1 includes a portable breathing equipment having a housing defining a cavity, and a cover movably coupled to the housing. A smoke hood is provided in a wrapper and positioned in the cavity. A first portion of the wrapper couples to the housing and a second portion of the wrapper couples to the cover. At least one of the cover or the housing is to cause the wrapper to tear to provide an access opening to allow access to the smoke hood when the cover moves from a closed position at which the cover seals the cavity of the housing and an open position at which the cover enables access to the cavity of the housing.

Example 2 includes the system of Example 1, where the housing includes a first retainer and the cover includes a second retainer.

Example 3 includes the system of any one of Examples 1-2, where the first retainer is coupled to the first portion of the wrapper and the second retainer is coupled to the second portion of the wrapper when the wrapper is positioned in the cavity and the PBE is in the closed position.

Example 4 includes the system of any one of Examples 1-3, where the first retainer is a first clip and the second retainer is a second clip.

Example 5 includes the system of any one of Examples 1-4, where the first retainer protrudes from an inner surface of a side wall of the housing toward the cavity and the second retainer protrudes from an inner surface of an inner wall of the cover.

Example 6 includes the system of any one of Examples 1-5, where the first retainer includes adhesive coupled to at least a portion of an inner wall of the housing and the second retainer includes adhesive coupled to at least a portion of an inner surface of the cover.

Example 7 includes the system of any one of Examples 1-6, further including a spring-biased hinge to movably couple the cover to the housing.

Example 8 includes the system of any one of Examples 1-7, further including a latch assembly movable between a latched position to maintain the cover in the closed position relative to the housing and an unlatched position to allow the cover to move to the open position relative to the housing.

Example 9 includes the system of any one of Examples 1-8 where the latch assembly includes an actuator to move a latch between the latched position and the unlatched position.

Example 10 includes the system of any one of Examples 1-9, where the actuator is to receive an input from a controller of an aircraft to move the latch between the latched position and the unlatched position.

Example 11 includes the method of any one of Examples 1-10, further including a controller coupled to the housing, the controller to cause the actuator to move from a latched position to an unlatched position.

Example 12 includes the system of any one of Examples 1-11, where further including at least one of a first sensor or a second sensor, the controller to cause the actuator to move from the latched position to the unlatched position in response to at least one of the first sensor sensing a first condition that is less than a first threshold and a second sensor sensing a second condition that is greater than a second threshold.

Example 13 includes a portable breathing equipment PBE including a container to house a smoke hood sealed in a wrapper. The container has a cover moveable between a closed position to prevent access to the smoke hood and an open position to allow access to the smoke hood. A latch is movable between a latched position to retain the container in the closed position and an unlatched position to allow the container to move to the open position. An actuator to move the latch between the latched position and the unlatched position.

Example 14 includes the PBE of Example 13, where the actuator is operational by at least one of a first signal obtained from a smoke sensor or a second signal obtained from a pressure sensor.

Example 15 includes the method of any one of Examples 13-14, where the container includes a retainer assembly configured to provide an access opening on the wrapper containing the smoke hood in response to the cover moving from the closed position to the open position.

Example 16 includes the system of any one of Examples 13-15, where the retainer assembly includes a first spring clip coupled to the container and a second spring clip coupled to the cover, the first spring clip to grip a first portion of the wrapper and the second spring clip to grip a second portion of the wrapper when the wrapper containing the smoke hood is positioned in the container and the cover is moved to the closed position during assembly of the PBE.

Example 17 includes the system of any one of Examples 13-16, where the retainer assembly includes a first adhesive located on a first surface of the container and a second adhesive located on a second surface of the cover, the first adhesive to adhere to a first portion of the wrapper and the second adhesive is to adhere to a second portion of the wrapper different from the first portion in response to the wrapper containing the smoke hood being placed in the container and the cover being moved to the closed position during assembly of the PBE.

Example 18 includes the system of any one of Examples 13-17, where the retainer assembly includes means for automatically providing an access opening on the wrapper to enable access to the smoke hood in response to the cover moving from the closed position to the open position.

Example 19 includes a method including obtaining a smoke hood positioned in a sealed wrapper; positioning the sealed wrapper containing the smoke hood in a cavity of a housing; coupling a first portion of the sealed wrapper to a first retainer to be carried by the housing; coupling a second portion of the sealed wrapper different than the first portion to a second retainer to be carried by a cover; and moving the cover to a closed position relative to the housing to prevent access to the sealed wrapper and the smoke hood, the first retainer and the second retainer to automatically cause the sealed wrapper to tear open to expose the smoke hood in response to the cover moving to an open position relative to the housing.

Example 20 includes the method of Example 19, further including operatively coupling a latch assembly to the PBE, the latch assembly movable between a latched position to maintain the cover in the closed position relative to the housing and an unlatched position to allow the cover to move to the open position to allow access to the smoke hood, the latch assembly configured to move between the latched position and the unlatched position in response to one or more inputs received from at least one of a controller or a sensor.

Example 21 includes the system of any one of Examples 19-20, further including pivotally coupling the cover to the housing via a spring-loaded hinge.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A portable breathing equipment (PBE) comprising:
   a housing defining a cavity;
   a cover movably coupled to the housing; and
   a smoke hood provided in a wrapper and positioned in the cavity, a first portion of the wrapper couples to the housing and a second portion of the wrapper couples to the cover, at least one of the cover or the housing to cause the wrapper to tear to provide an access opening to allow access to the smoke hood when the cover moves from a closed position, at which the cover seals the cavity of the housing, to an open position, at which the cover enables access to the cavity of the housing.

2. The PBE of claim 1, wherein the housing includes a first retainer and the cover includes a second retainer.

3. The PBE of claim 2, wherein the first retainer is coupled to the first portion of the wrapper and the second retainer is coupled to the second portion of the wrapper when the wrapper is positioned in the cavity and the PBE is in the closed position.

4. The PBE of claim 2, wherein the first retainer is a first clip and the second retainer is a second clip.

5. The PBE of claim 4, wherein the first retainer protrudes from an inner surface of a side wall of the housing toward the cavity and the second retainer protrudes from an inner surface of an inner wall of the cover.

6. The PBE of claim 2, wherein the first retainer includes adhesive coupled to at least a portion of an inner wall of the housing and the second retainer includes adhesive coupled to at least a portion of an inner surface of the cover.

7. The PBE of claim 1, further including a spring-based hinge to movably couple the cover to the housing.

8. The PBE of claim 1, further including a latch assembly movable between a latched position to maintain the cover in the closed position relative to the housing and an unlatched position to allow the cover to move to the open position relative to the housing.

9. The PBE of claim 8, wherein the latch assembly includes an actuator to move a latch between the latched position and the unlatched position.

10. The PBE of claim 9, wherein the actuator is to receive an input from a controller of an aircraft to move the latch between the latched position and the unlatched position.

11. The PBE of claim 9, further including a controller coupled to the housing, the controller to cause the actuator to move from a latched position to an unlatched position.

12. The PBE of claim 11, further including at least one of a first sensor or a second sensor, the controller to cause the actuator to move from the latched position to the unlatched position in response to at least one of the first sensor sensing a first condition that is less than a first threshold and a second sensor sensing a second condition that is greater than a second threshold.

13. A portable breathing equipment (PBE) comprising:
    a container to house a smoke hood sealed in a wrapper, the container having a cover moveable between a closed position to prevent access to the smoke hood and an open position to allow access to the smoke hood;

a retainer assembly configured to provide an access opening on the wrapper containing the smoke hood in response to the cover moving from the closed position to the open position;

a latch movable between a latched position to retain the container in the closed position and an unlatched position to allow the container to move to the open position; and an actuator to move the latch between the latched position and the unlatched position.

14. The PBE of claim 13, wherein the actuator is operational by at least one of a first signal obtained from a smoke sensor or a second signal obtained from a pressure sensor.

15. The PBE of claim 13, wherein the retainer assembly includes a first clip coupled to the container and a second clip coupled to the cover, the first clip to grip a first portion of the wrapper and the second clip to grip a second portion of the wrapper when the wrapper containing the smoke hood is positioned in the container and the cover is moved to the closed position during assembly of the PBE.

16. The PBE of claim 13, wherein the retainer assembly includes a first adhesive located on a first surface of the container and a second adhesive located on a second surface of the cover, the first adhesive to adhere to a first portion of the wrapper and the second adhesive is to adhere to a second portion of the wrapper different from the first portion in response to the wrapper containing the smoke hood being placed in the container and the cover being moved to the closed position during assembly of the PBE.

17. The PBE of claim 13, wherein the retainer assembly includes means for automatically providing the access opening on the wrapper to enable access to the smoke hood in response to the cover moving from the closed position to the open position.

18. A method for assembling a portable breathing equipment (PBE) comprising:

obtaining a smoke hood positioned in a sealed wrapper;

positioning the sealed wrapper containing the smoke hood in a cavity of a housing;

coupling a first portion of the sealed wrapper to a first retainer to be carried by the housing;

coupling a second portion of the sealed wrapper different than the first portion to a second retainer to be carried by a cover; and moving the cover to a closed position relative to the housing to prevent access to the sealed wrapper and the smoke hood, the first retainer and the second retainer to automatically cause the sealed wrapper to tear open to expose the smoke hood in response to the cover moving to an open position relative to the housing.

19. The method of claim 18, further including operatively coupling a latch assembly to the PBE, the latch assembly movable between a latched position to maintain the cover in the closed position relative to the housing and an unlatched position to allow the cover to move to the open position to allow access to the smoke hood, the latch assembly configured to move between the latched position and the unlatched position in response to one or more inputs received from at least one of a controller or a sensor.

20. The method of claim 18, further including pivotally coupling the cover to the housing via a spring-loaded hinge.

* * * * *